United States Patent [11] 3,615,675

| [72] | Inventors | Lawrence Wisdom<br>Dallas;<br>David P. Fowler, Fort Worth, Tex.; Robert<br>E. Zinn, Lexington, Mass. |
|------|-----------|---|
| [21] | Appl. No. | 657,251 |
| [22] | Filed | July 31, 1967 |
| [45] | Patented | Oct. 26, 1971 |
| [73] | Assignee | Frito-Lay, Inc.<br>Dallas, Tex. |

[54] METHOD FOR MAKING CENTER-FILLED PUFFED FOOD PRODUCT
11 Claims, 4 Drawing Figs.

[52] U.S. Cl. .................................................... 99/83, 99/238 R
[51] Int. Cl. .................................................... A23l 1/10, A23l 1/18
[50] Field of Search ............................................ 99/81, 82, 80, 83, 86; 107/1, 1.1, 1.4, 1.9, 54

[56] References Cited
UNITED STATES PATENTS

| 1,265,853 | 5/1918 | Wiseman | 107/1 |
| 3,450,538 | 6/1969 | McKown et al. | 99/81 |
| 1,787,900 | 1/1931 | Goff | 107/1 |
| 2,693,419 | 11/1954 | Gager | 99/83 |
| 2,954,295 | 9/1960 | Clausi et al. | 99/82 |
| 3,462,276 | 8/1969 | Benson | 99/83 X |
| 3,480,445 | 11/1969 | Slaybaugh | 99/83 |

*Primary Examiner*—Raymond N. Jones
*Assistant Examiner*—James R. Hoffman
*Attorney*—Roylance, Abrams, Berdo & Kaul

ABSTRACT: A light puffed or expanded food product which has a core filled with an edible pastelike or creamy material. The apparatus for making this product includes an extruder capable of developing high pressures and elevated temperatures in a mass of edible material such as corn meal to which water and vegetable oil have been added. The material exits the extruder through an orifice, at which point the edible material expands significantly due to the vaporization of the water. through the orifice, a tube extends for the introduction of the core material into the center of the expanded material. The preferred but not essential length of the tube is more than 50 times its diameter, and its diameter increases progressively from the orifice toward the tube outlet. The filling material in the tube and the surrounding atmosphere cool and accelerate the hardening and maturing of the expanded material and eliminate vapor pockets in the core.

PATENTED OCT 26 1971 3,615,675

INVENTORS
LAWRENCE W. WISDOM
DAVID P. FOWLER &
ROBERT E. ZINN

BY *Beale and Jones*

ATTORNEYS

PATENTED OCT 26 1971 3,615,675

INVENTORS

LAWRENCE W. WISDOM
DAVID P. FOWLER &
ROBERT E. ZINN

BY *Beale and Jones*

ATTORNEYS

METHOD FOR MAKING CENTER-FILLED PUFFED FOOD PRODUCT

BACKGROUND OF THE INVENTION invention pertains to a new type of snack item which comprises an expanded, cellular, edible shell portion and an edible, center portion.

This invention also pertains to a method and apparatus for preparing such items.

There are many types of flavored snack items on the market today such as puffed, farinaceous products which are coated with cheese. A disadvantage of such items is the fact that the flavoring material used to coat the products readily rubs off causing stains and stickiness on the consumer's hands.

Comestible products having layers of different materials are known to the art. Exemplary of such items are ravioli in which an edible material such as meat is encased in dough; center-filled candies in which a candy shell encases a creamy filling material; and fruit-filled cereal biscuits. However, none of these known products have expanded, cellular shells.

In the prior art, there are also numerous die-expressing devices which form composite products. It is known to express different materials through concentric dies in order to form comestible products which have layers of different materials. These prior art devices are used in the manufacture of pastry and confectionary goods, and, due to features of their construction, they are incapable of producing a satisfactory product in which a center core is enclosed by a light, expanded cellular shell of edible material. This inability to perform in the manner of the present invention is due to differences in extruder performance and in the construction of the central tube which injects the filling material.

In manufacturing products which have a central core of filling material and an outer shell of light, expanded cellular material, there are several problems which must be overcome. First, it is necessary to generate unusually high pressures in the shell material before it is exposed to the atmosphere where it expands. Also, it is desirable that the center-filling material uniformly fills the core and does not migrate to any significant extent into the cells of the outer shell material. Cooling of the hot expanded shell should be accelerated. The expanded outer shell material should be free of irregularities which may detract from its appeal as a commercial snack item.

The various features of this invention provide solutions to the problems discussed above. The precise way in which this is done is described in the following description of the invention.

SUMMARY OF THE INVENTION

Briefly, the products of this invention are snack items having edible, expanded cellular outer portions which surround inner portions of an edible material which is different than the outer portion.

The apparatus of this invention comprises a screw extruder or other means capable of developing in a mass of food material a superatmospheric pressure and a temperature which is above the atmospheric boiling temperature of liquids within the edible material. Leading from the extruder, there is an orifice through which the material passes to an area of atmospheric or other suitable reduced pressure. After exiting the orifice, the material expands due to the vaporization of the liquids to form a light and cellular product.

One aspect in which the apparatus of this invention differs from the prior art is the novel relationship between the extrusion orifice and a needlelike tube which is used to inject filling material into the expanded shell material. The tube projects axially through the orifice and extends therebeyond a substantial distance in a direction along the path taken by the hollow, light, expanded shell material. This tube extends beyond the extrusion orifice a distance which is preferably greater than 50 times its diameter. Also, the tube has an inside diameter which increases progressively from the extrusion orifice towards the tube outlet to the extent that the cross-sectional area of the bore at its outlet is preferably greater than twice its cross-sectional area at the orifice.

The method of this invention involves making a light, expanded product from a food material by expanding and forming the food material into a cellular hollow body and introducing a filling material into the hollow portion of the body. As applied to the apparatus of this invention, the method is one in which the food material is expanded and formed into a cellular, hollow body and then cooled both exteriorly and interiorly as it passes away from the extrusion orifice. Internal cooling may be a direct result of the fact that the creamy or pastelike filling material passing through the tube is of a temperature substantially less than that of the hot expanded shell material which surrounds the tube. The length of the tube and the temperature of its contents serve as a heat sink for the withdrawal of heat from the center of the tubular body. The filler material is continuously injected into the hollow body through the outlet of the tube.

With the foregoing comments in mind, it will be recognized that it is a principal object of this invention to provide light, expanded food products with an interior core of filling material.

A further object of this invention is to provide an apparatus which will effectively produce such a food product.

Another object is to provide a method which by interiorly cooling a hollow body of the hot expanded material will eliminate vapor pockets and accelerate its maturing so that it may be subjected at an early stage to filling, forming and cutting operations.

Still another object of the invention is to provide an apparatus having a central tube which is capable of supplying a smooth, uninterrupted flow of core-filling material into the hollow shell material by virtue of the increased internal diameter of the tube.

Numerous other objects are realized as a direct result of the invention which includes the products, apparatus and method disclosed herein. These other objects will be apparent to those skilled in the art from the following discussion.

DESCRIPTION OF THE PREFERRED EMBODIMENTS

The food material which may be used in the preparation of the shell portion of the products of this invention may be any farinaceous product such as meal or flour derived from corn, wheat, rice, oats, barley, potatoes, tapioca, etc. The preferred farinaceous material is corn meal.

In order for the farinaceous material to expand or puff upon extrusion, it preferably contains from about 10 to 25 percent by weight of water. This amount of moisture also renders the farinaceous material less viscous and, therefore, more easily extruded. However, an excessive amount of moisture will limit expansion and delay maturing or curing of the expanded material.

Up to 10 percent by weight of an oil, such as coconut oil or cottonseed oil may advantageously be added to the farinaceous shell material before extrusion. The presence of the oil helps to control expansion and cell size of the farinaceous shell material after it is extruded. It also reduces or substantially eliminates the number of blisters formed on the extruded shell portion and improves product uniformity.

Up to about 1 ¾ percent by weight of salt or other texturing agents may be added to the farinaceous material before it is extruded. The salt tends to improve the texture of the final products.

Various other conventional food additives may be admixed with the farinaceous material depending upon the type of product desired. Such additives include, for example, food dyes and flavoring agents.

The center portion of the products of this invention may be any pastelike or creamy edible material such as peanut butter, cheese paste, a sugar-starch paste, etc. Such materials are conventional and will not be described in detail herein.

Figure 1:
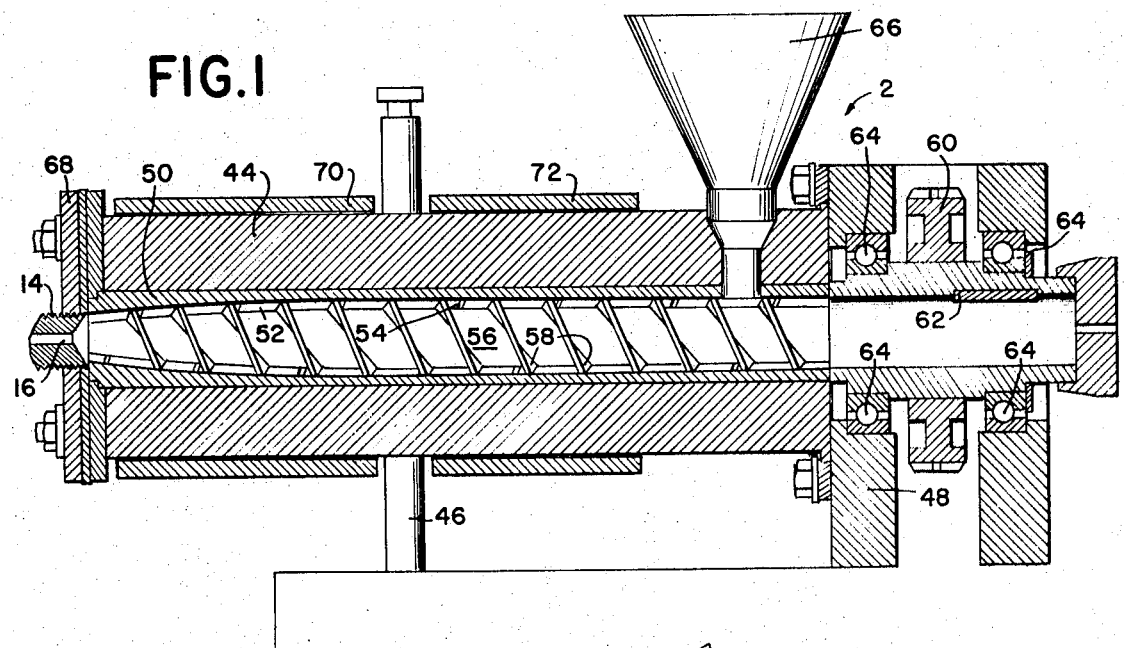
FIG. 1 is a view partly in section of an extruder capable of generating the high temperatures and pressures utilized in the practice of the invention.
Figure 2:
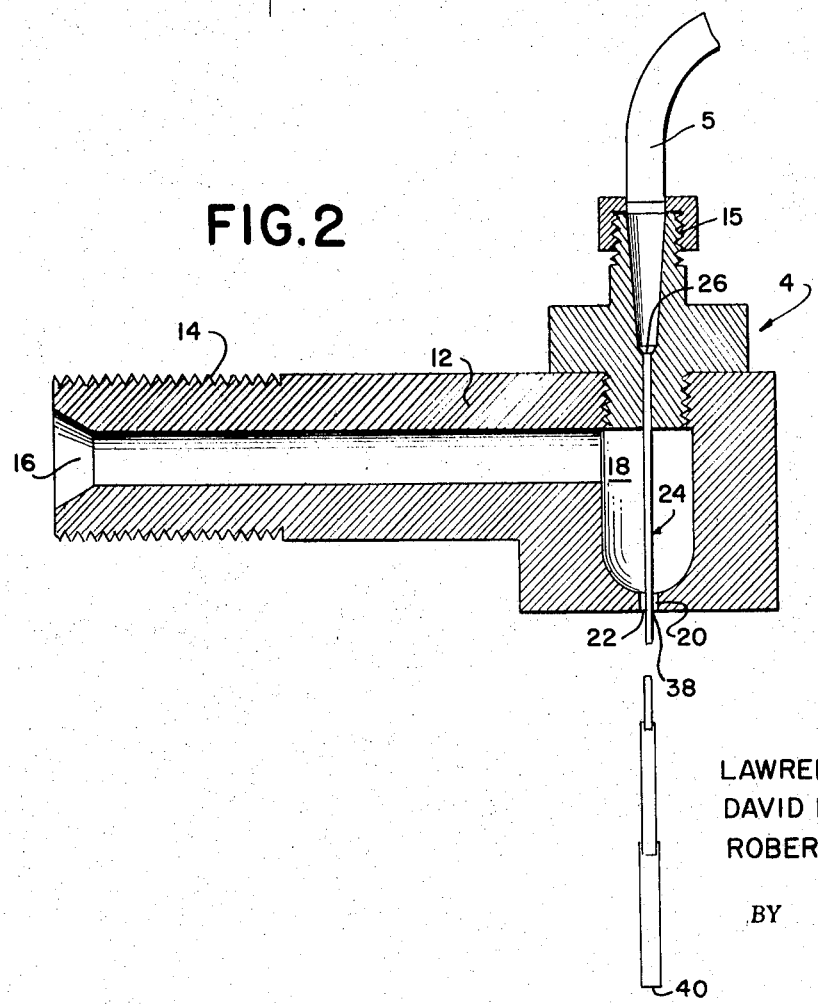
FIG. 2 is a sectional view of the extruder die showing the tube for the filling material, broken away in part for convenience of illustration.

Referring to FIGS. 1 and 2, it will be seen that the basic apparatus used for making the products of this invention includes an extruder 2 which discharges the food material, an extrusion die 4 and a hose 5 leading to a high pressure pump (not shown) for introducing the filling material. The extruder 2 is capable of generating high superatmospheric pressure and elevated temperatures in the material being extruded.

The main body of the extruder 2 and a portion of the extruder die 4 are illustrated partially in section in FIG. 1. The extruder comprises a heavy tubular body 44 which is supported at its forward end by member 46 and at its rear end by the housing 48. A removable sleeve 50 lies within the tubular body 44 and includes a bore 52 of progressively reducing cross section. The sleeve 50 may be helically grooved as at 54. Within the bore, there is a screw member 56 with raised helical threads 58. The screw 56 is driven by suitable gearing means including the gear 60 which is keyed to the screw shaft at 62 and supported on bearing means 64. The material is introduced into the chamber of the extruder through a hopper 66. Then it moves progressively to the left as illustrated in FIG. 1 to the mounting plate 68 to which the die member 4 is attached by means of threaded portion 14. The material then moves into the passage 16 as described hereinafter. Surrounding the tubular body 44 are heat exchange devices 70 and 72 which may be adjusted to produce the desired temperature in the material being worked.

During the passage of the farinaceous material through the extruder, the pressure on the material increases and it becomes a flowable, gelatinized, semiplastic mass in which the water remains in its liquid state due to the pressures and temperatures generated. When the material leaves the extruder outlet orifice and is exposed to a reduced pressure such as atmospheric pressure, the moisture readily vaporizes to form a highly porous, puffed, cellular body.

The manner of forming the continuous hollow body and of introducing the flavored filling material is best understood by reference to FIG. 2 which shows a sectional view of the extrusion die 4. This die includes a main body 12 which is threaded at 14 for attachment to an adapter which mounts to a main body of the extruder 2 and which is threaded at 15 for attachment to a hose 5 leading to a high-pressure pump. Material from the screw of the extruder enters the body 12 and passes through the passage 16 to the enclosed chamber 18.

The extruder is operated to produce a pressure of at least 100 atmospheres and a temperature of at least 100° C. in the chamber 18. An opening 20 from the chamber 18 leads to the outlet orifice 22 where the corn meal or other material is exposed to the reduced pressure at which its moisture is vaporized to form the light, expanded shell for the product.

Extending centrally through the orifice 22 is an elongated tube 24 through which the edible core-filling material passes on its way to the center of the hollow shell portion. This, in effect, makes the orifice 22 of generally annular shape. The tube is centered in the orifice 22, i.e., it is spaced from the walls of the passage 20, but concentricity of the elements 20 and 24 is not essential. The term "annular orifice" is used herein in its broader sense which includes noncircular boundaries and nonconcentric bodies. The tube has an inlet 26 for receiving the edible filling material from a pump (not shown) which supplies the material at about normal ambient temperature— e.g., about 70° to 90° F.

From the inlet 26, the tube 24 extends through the chamber 18 and opening 20. The tube extends beyond the orifice 22 for a substantial distance and it increases progressively in internal diameter from the point 38 in the orifice 22 to the outlet 40. This increase in diameter may be gradual or it may be in the step-by-step fashion shown in FIG. 2. The tube has a relatively thin wall and the distance from point 38 to outlet 40 is preferably at least 50 times the outside diameter of the tube 24 at the point 38. The outlet 40 which lies within the center of the expanded material 42 has a cross-sectional area which is at least two times the cross section of the tube 24 at the point 38. In the disclosed embodiment, the area at outlet 40 is more than four times the area at the point 38.

As the corn meal or other gelatinized material passes through the annular orifice 22, there is formed a continuous, expanded hollow body. As this hollow body passes along the length of the tube 24, it is cooled both exteriorly by the surrounding atmosphere and interiorly by the tube 24—i.e., the tube 24 filled with the filling which remains at a relatively low temperature receives some of the heat from the hollow body. The hollow body is in a soft and unstable condition as it emerges from the orifice 22 and, as it is cooled passing along the length of the tube 24, it is stabilized or matured. The stabilizing or maturing process is substantially complete by the time the hollow body reaches the end of the tube 24. It is preferred that the length of the tube 24 extending beyond the orifice 22—i.e., between points 38 and 40—be at least 15 times as long as the outside diameter of the expanded hollow shell when it reaches the outlet 40 of the tube.

As the hollow body passes over the outlet 40 of the tube 24, filling material is simultaneously and continuously introduced into the center portion thereof. Toward the outer end of the tube 24, where the tube expands in cross-sectional area, the velocity of the filling material is reduced so that it passes through the tube outlet 40 at a velocity substantially equal to the velocity of the expanded hollow shell at that point. Since the shell material is cooled and substantially mature at the time of introduction of the filling material, there are no vapor pockets or discontinuities in the center-filled portion—i.e., the center filling is continuous and uniform. Moreover, the filling material is not forced by pressure into the cells of the shell portion as would be likely to occur if the filling material were introduced immediately after the shell portion emerged from the orifice 22.

Still another advantageous feature of the illustrated design of tube 24 is that its larger diameter in the section adjacent the outlet 40 affords a larger area for heat transfer and serves to contact and smooth the interior bore of the hollow expanded material in order to close off cells to prevent migration of the filling material into the cells. This design also reduces the pressure requirements of the pump which feeds the filler material to the inlet 26 since less pressure is required to force the material through a passage of increasing diameter than through a narrow passage of constant diameter.

Whenever utilizing the extrusion apparatus of this invention, normal experimentation is required in order to determine the proper proportions of the mixture and of the apparatus. Satisfactory results have been achieved with an extruder which produces at the outlet 20 pressures from 2,000 to 4,000 lbs. per square inch and temperatures of from 100° to 150° C.

The extruded material is sufficiently coherent to hang unsupported without fracture after it has passed from the end of the tube 24. It may be passed through a shaping means to remove surface irregularities. The filled expanded material is then divided into segments. Conventional apparatus may be used for shaping and dividing the extruded material into segments.

The products 10 are then baked by conventional means. Baking sets the filler material into a firm filling and removes most of the residual moisture to develop a tender, brittle texture. The products may then be salted according to known techniques. It is preferred to salt them while they are still hot from the oven.

Figure 3:
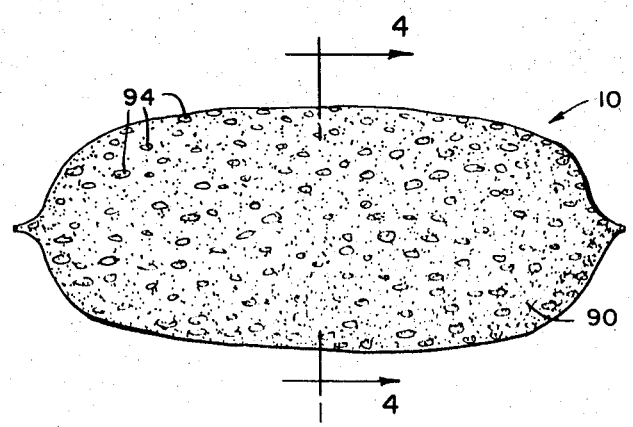
FIG. 3 is a side view of one of the food products of this invention.
Figure 4:
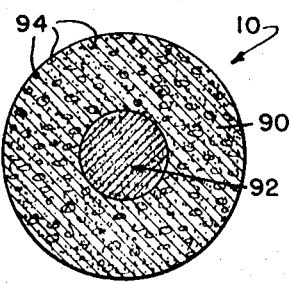
FIG. 4 is a cross-sectional view taken along line 4—4 of FIG. 3.

As seen in FIGS. 3 and 4, a product 10 is comprised of an outer portion 90 which completely surrounds and encases the inner portion 92. The outer portion 90 contains a plurality of cells 94 while the inner portion 92 is noncellular. The walls of the outer portion 90 are substantially devoid of any of the filler paste which comprises the inner portion 92.

The outer portion 90 of the product has a very low bulk density. This may best be illustrated by reference to the apparent density of the outer portion—i.e., the ratio of the density of the cellular outer portion to the density of a corresponding composition in unexpanded, non-cellular form. This ratio will always be less than 1.0 and will generally be from about 0.035 to 0.35.

The following examples illustrate the best modes contemplated for carrying out this invention.

EXAMPLE 1

A corn meal composition is prepared by admixing 200 lbs. of raw corn meal, 13 lbs. of cottonseed oil, 15 lbs. of water and 36 g. of dye. The corn meal is fed to the hopper of an extruder as hereinabove described at the rate of 125 to 150 lbs. per hour. Peanut butter is introduced to the extrusion dye by means of a high-pressure pump at a pressure of 3,200 p.s.i. The extruded material having a diameter of about eleven-sixteenths inch is then passed to shaping rolls, wherein the diameter is reduced to five-eighths of an inch. The filled, expanded material is then cut into 2-inch pieces. The pieces are baked at 280° F. plus or minus 10° F. for from 18 to 20 minutes. During baking, the moisture content is reduced from 12 to 14 percent by weight to about 2 percent by weight. After baking, the products are salted while still hot to deposit about 1.5 percent by weight of salt on their surfaces. The resultant products are tender, brittle snack items having a bulk density of from 9.0 to 11.0 per cubic foot. The weight ratio between the filling and the shell portion of each product is about 1:1.

EXAMPLE 2

By the process described in the preceding example, a chocolate-flavored snack product is prepared. The material fed to the extruder comprises a mixture of 200 lbs. of raw corn meal, 12 lbs. of Dutch process chocolate, 14 lbs. of cottonseed oil, and 18 lbs. of water. The filling is prepared by admixing 24.6 lbs. of hydrogenated coconut oil, 35.3 lbs. of sugar, 18 mls. of vanilla flavor and 24.5 g. of salt. The filling is fed to the extrusion die at a temperature of 70° to 90° F. and a pressure of 1,480 p.s.i. The resultant cream filled puffs have a bulk density of from 9.0 to 11.0 lbs. per cubic foot and the weight ratio between the filling and the shell portion of each product is about 1:1.

EXAMPLE 3

Cheese-flavored snack items are prepared by the process described in example 1. The corn meal composition fed to the extruder comprises a mixture containing 200 lbs. of raw corn meal, 13 lbs. of cottonseed oil, 15 lbs. of water and 60 g. of a dye. The filling is prepared by admixing 30 lbs. of hydrogenated coconut oil, 12.8 lbs. of pregelatinized wheat starch, 18.7 lbs. of aged, dehydrated cheddar cheese and 0.9 lbs. of salt. The filling is fed to the extrusion dye at a temperature of about 80° F. and a pressure of 2,000 p.s.i. The resultant cheese-filled puffs have a bulk density of from 9.0 to 11.0 lbs. per cubic foot. The weight ratio between the filling and the shell portion of each product is approximately 1:1. L There are many variations to the specific embodiments shown which are within the scope of the present invention. Therefore, the invention is not limited to the embodiments shown, but encompasses the numerous modifications and improvements which fall within the claims which follow.

We claim:
1. The method of making a light, expanded, center-filled food product comprising the steps of:
    a. creating in a mass of food material containing a liquid, superatmospheric pressures and temperatures in excess of the boiling point of the liquid at a given lesser pressure;
    b. passing said material through a generally annular orifice to a zone of said given lesser pressure, thereby expanding said material by vaporizing the liquid therein;
    c. moving said expanded material as an elongated hollow body through a cooling zone which has a length substantially greater than the outside diameter of the hollow body, and withdrawing heat from said hollow body into said cooling zone, and
    d. injecting a filling material into the center of said hollow body after said hollow body is expanded and is sufficiently coherent to hang unsupported without fracturing.
2. The method of claim 1 wherein said elongated hollow body is moved along an interiorly located elongated cooling zone of increasing diameter and said filling material is injected into the center of said hollow body through said elongated cooling zone, whereby said filling material receives some of the heat from said hollow body prior to injection into the center of said hollow body.
3. The method of claim 2 in which the length of the cooling zone is at least 15 times the outside diameter of the hollow body passing from the cooling zone.
4. The method of claim 1 wherein the center-filled hollow body is divided into segments and said segments are then baked.
5. The method of claim 4 wherein the mass of edible material containing a liquid is a farinaceous material containing from about 10 to 25 percent by weight of water, up to 10 percent by weight of a liquid oil and up to 1 ¾ percent by weight of salt.
6. The method of claim 4 wherein the farinaceous material is corn meal.
7. The method of claim 4 wherein the mass of edible material is at a temperature of from about 100° to 150° C. and under a pressure of from about 3,000 to 4,000 p.s.i. at said annular orifice.
8. The method of making a light, expanded, center-filled food product comprising the steps of:
    a. creating in a mass of food material containing a liquid, superatmospheric pressures and temperatures in excess of the boiling point of the liquid at a given lesser pressure;
    b. continuously passing said material to a zone of said lesser pressure, thereby expanding said material by vaporizing the liquid therein;
    c. moving said expanded material as an elongated hollow body through a cooling zone, thereby cooling said hollow body; and
    d. continuously introducing a filling material into the hollow portion of said cooled continuous body.
9. The method of claim 8 wherein said filled continuous body is divided into segments.
10. The method of claim 8 wherein said food material is a farinaceous material.
11. The method of claim 10 wherein said farinaceous material is corn meal.

* * * * *